(12) United States Patent
Lloyd (10) Patent No.: US 7,909,468 B2
(45) Date of Patent: Mar. 22, 2011

(54) DISPLAY DEVICE AND METHOD

(76) Inventor: Beverly Lloyd, Lake Hopatcong, NJ (US)

( * ) Notice: Subject to any disclaimer, the term of this patent is extended or adjusted under 35 U.S.C. 154(b) by 636 days.

(21) Appl. No.: 11/870,574

(22) Filed: Oct. 11, 2007

(65) Prior Publication Data

US 2008/0273176 A1 Nov. 6, 2008

Related U.S. Application Data

(60) Provisional application No. 60/916,014, filed on May 4, 2007.

(51) Int. Cl.
*G03B 21/06* (2006.01)
(52) U.S. Cl. .......................... 353/50; 353/66
(58) Field of Classification Search .................... 353/50, 353/66
See application file for complete search history.

(56) References Cited

U.S. PATENT DOCUMENTS

| | | | |
|---|---|---|---|
| 2,758,502 A | 10/1956 | Scott et al. | |
| 2,814,029 A | 11/1957 | McRea | |
| 3,621,133 A | 11/1971 | Baker et al. | |
| 3,767,299 A | 10/1973 | Fisher | |
| 4,196,461 A | 4/1980 | Geary | |
| 4,764,850 A | 8/1988 | Albanese | |
| 4,942,502 A | 7/1990 | Ohashi | |
| 5,934,223 A | 8/1999 | Ellery-Guy | |
| 6,113,458 A | 9/2000 | Brown | |
| 6,145,228 A | 11/2000 | LaChance | |
| 6,330,059 B1 * | 12/2001 | Ishiguro et al. ............ 356/237.5 |
| 6,416,195 B1 * | 7/2002 | Lin ................... 362/35 |
| 6,540,381 B1 * | 4/2003 | Douglass, II ............ 362/311.09 |
| 6,584,713 B2 * | 7/2003 | Huang ................... 362/811 |
| 6,793,355 B1 | 9/2004 | Leung | |
| 6,958,869 B2 | 10/2005 | Monastiere | |
| 7,153,022 B2 | 12/2006 | Dear | |
| 7,182,472 B2 | 2/2007 | Vitantonio et al. | |

\* cited by examiner

*Primary Examiner* — Seung C Sohn
(74) *Attorney, Agent, or Firm* — Thomas L. Adams (57) ABSTRACT

A reflective or light redirecting device has a base with an overlaying pattern or light redirector. The pattern can be selected from a collection of masks, templates, or reflective appliques. The device is arranged to reflect or redirect light, for example sunlight, in a beam that projects a corresponding design. A motor rotates the device and reorients its directional axis to reflect light toward a surface to circulate the design on a path on the surface.

39 Claims, 6 Drawing Sheets

DISPLAY DEVICE AND METHOD

CROSS-REFERENCES TO RELATED APPLICATIONS

This application claims the benefit of U.S. Provisional Patent Application Ser. No. 60/916,014, filed 4 May 2007, the contents of which are hereby incorporated herein by reference.

BACKGROUND OF THE INVENTION

1. Field of the Invention

The present invention relates to display devices and methods, and in particular, to using reflected light to project a moving design.

2. Description of Related Art

Light is often projected for decorative, aesthetic, or amusement purposes. A spotlight can shine through a rotating wheel having different colored segments to produce a light beam with time-varying colors. A spotlight can shine on a rotating globe covered with a mosaic of mirrors to project multiple light beams that circulate around a room, such as a dance floor. More sophisticated light shows have used laser beams that trace out highly complex patterns using computer-controlled beam displacement.

Shadow plays are performed by projecting the shadows of puppets and other characters to form silhouettes on a projection surface. Also, a simple slide projector uses a projection lamp, transparency, and biconvex lens to project an image of the transparency onto a screen.

Various devices exist for changing or redirecting light. For example prisms are used to take an incident light beam and redirect it at an angle depending upon the color of the incident beam. For sunlight, the prism can separate the colors into the well-known color spectrum. This prismatic effect can be seen in various jewel cuts or in faceted crystal elements hanging in a chandelier. Other complex light effects can be produced by simple diffraction gratings or by a known holographic diffraction grating film.

Light is often redirected for utilitarian purposes. Rotating lights on emergency vehicles and traditional lighthouses are two well-known examples. Light can also be projected for educational purposes as in a planetarium.

Sunlight is often used for decorative and aesthetic reasons. Stained-glass windows illuminated by sunlight provide an attractive colored image, although that image is located only at the window. Nature also provides its special light shows with the rainbow or with the sparkling effect produced by light reflected from the ripples in a stream.

See also U.S. Pat. Nos. 2,758,502; 2,814,029; 3,621,133; 3,767,299; 4,196,461; 4,764,850; 4,952,502; 5,906,427; 5,934,223; 6,113,458; 6,145,228; 6,793,355; 6,958,869; 7,153,022; 7,182,472; D396,122; D424,230; and D521,173.

SUMMARY OF THE INVENTION

In accordance with the illustrative embodiments demonstrating features and advantages of the present invention, there is provided a display device including a motor and a reflective device. The reflective device has a directional axis and a base with an overlaying pattern. The reflective device is arranged to reflect light in a beam that projects a design corresponding to the pattern. The motor can cyclically move the reflective device.

In accordance with another aspect of the invention, a display method is provided that employs a reflective device having a directional axis. The method includes the step of placing the reflective device in a position to reflect sunlight onto a surface. Another step is rotating the reflective device and reorienting the directional axis to reflect sunlight onto the surface to follow a closed curved path.

In accordance with yet another aspect of the invention, a display method is provided that employs a base and a collection of overlaying patterns. The method includes the step of selecting one or more of the patterns for placement upon the base. Another step is orienting the base to receive incident light, the method also includes the step of cyclically moving the base in order to reflect light toward a surface to follow a path on the surface cyclically.

In accordance with still yet another aspect of the invention, a display device has a light redirecting device including a base with an overlaying light redirector. This light redirecting device is arranged to redirect light in a design determined by the light redirector. The device also has a motor for rotating and nutating the light redirecting device.

Devices built according to the foregoing principles can produce a pleasing light effect. In one embodiment a reflective device such as a mirror mounted on a motor drive shaft is canted so the mirror wobbles as the motor shaft rotates. Consequently, sunlight incident to the mirror will be reflected at an angle that changes as the motor shaft rotates. By adjusting the angular position of the motor shaft as well as the angular canting of the mirror relative to the shafts one can cause the reflected sunlight to trace a closed path on various surfaces inside a room.

The angle of the motors shaft can be adjusted by attaching the rear of the motor to a platform that is hinged to a base. The shaft is adjusted by changing the angle of the hinged platform and by azimuthally rotating the base. Also, the canting of the mirror can be adjusted through a ball and socket joint or through a simple pivot joint.

By placing a stencil-like pattern over a rotating mirror, the reflected sunlight can produce an image corresponding to the outline of the pattern. This pattern may be one of a collection of patterns. The image projected by the mirror and pattern will maintain the same orientation relative to the closed path. For example if the projected image is a bird, the bird's head will continue to point in the direction of travel along the path (that is, the bird's heading will be the same as the heading of the path). In some cases the mirror will not rotate 360° but instead will oscillate through a smaller angle to cast an image that oscillate similarly. In still other examples the reflective device may be mounted perpendicular to the motor shaft, in which case the reflected image will be projected to a fixed position and simply rotate about its center.

In one embodiment, the motor is powered by a solar cell. Thus, the unit is self-contained and the motor will only rotate when needed; that is, when sunlight is incident on the mirror. The user may wish to set up the display device on a windowsill with an appropriate orientation so that the device produces its light effect at the same time every day. Alternatively, the user can reposition the display device throughout the day to extend the period of operation.

In other embodiments the rotating mirror is replaced with a simple non-reflective base and reflective appliques are placed atop that base. In still other embodiments a multifaceted, prismatic device can be placed on a rotating base to produce a pleasing effect. Alternatively, a holographic diffraction grating can be placed on the rotating base.

Other embodiments may have added features. For example, some embodiments may have a separate power source that will drive multiple rotating bases through a drive train. Still other embodiments may have a separate light source for one or more of the rotating bases. In some cases the rotating base will be a tray that rocks about a longitudinal axis to cover only an acute angle. In some cases the tray may be filled with a selection of letter stencils in order to project a chosen word.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein.

DETAILED DESCRIPTION OF THE PREFERRED EMBODIMENTS

Figure 1:
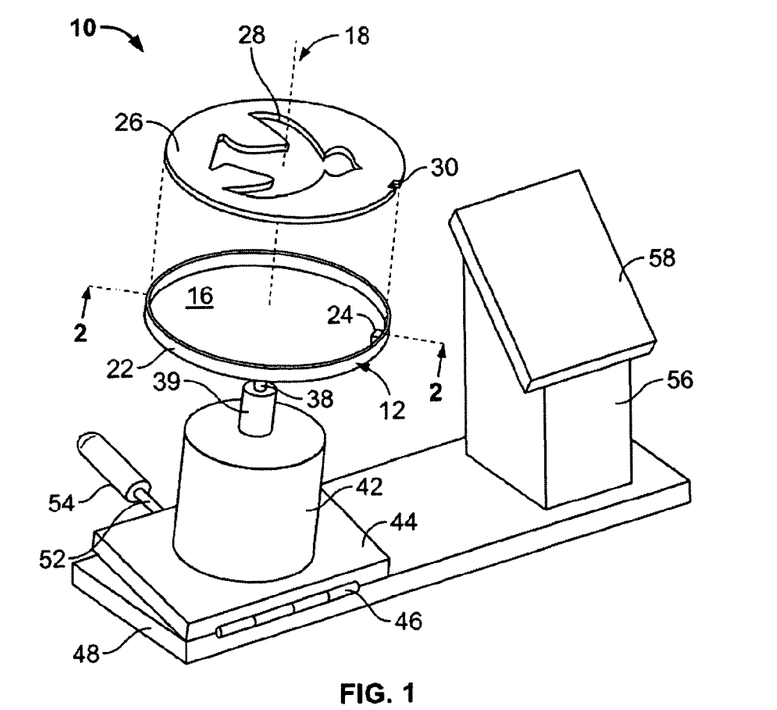
FIG. 1 is a perspective view of a reflective device in accordance with principles of the present invention.
Figure 2:
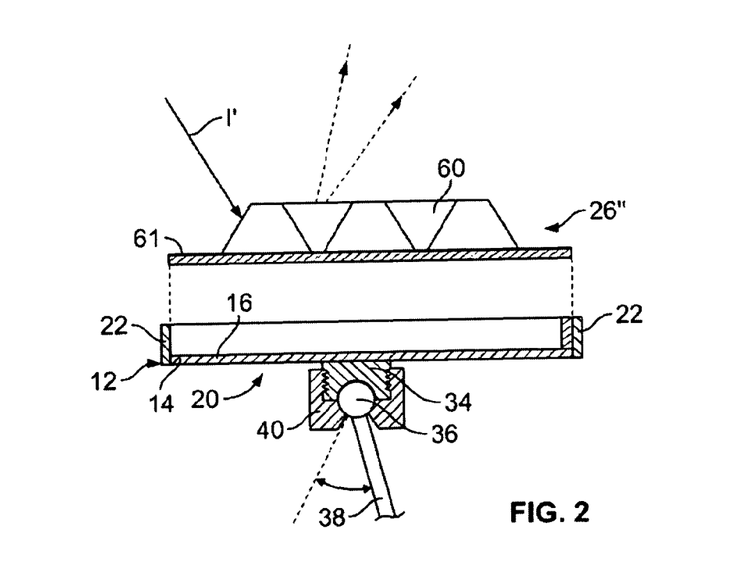
FIG. 2 is a detailed view, partly in section, of the base of FIG. 1 but shown about to be fitted with a an alternate light redirector.
Figure 3:
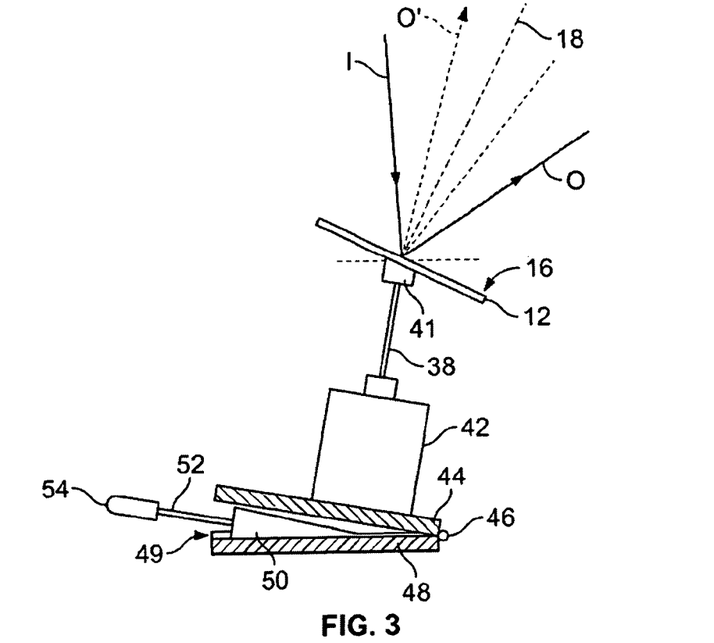
FIG. 3 is an end view, partly in section, of the device FIG. 1.

Referring to FIGS. 1-3, rectangular base 48 of display device 10 has at one end a rectangular pedestal 56 with a truncated, slanted top. Attached to the slanted top of pedestal 56 is solar cell 58 (also referred to as solar powered electrical device).

Hinged platform 44 is a rectangular board that is attached by hinge 46 at an end of base 48 opposite solar powered electrical device 58. Hinged platform 44 overlays about a third of base 48 and has about the same thickness. Hinge 46 allows platform 44 to articulate along one of the long edges of base 48. In some embodiments, hinge 46 may alternatively be a live hinge. In addition, platform 44 may alternatively be a piece of flexible material such as fabric attached along one side to base 48. In some embodiments, platform 44 may be mounted to base 48 through a ball and socket joint, providing platform 44 with two degrees of freedom.

Wedge 50 (FIG. 3) is a substantially triangular prism slidably positioned between hinged platform 44 and base 48. Wedge 50 travels in a trench 49 in base 48 and raises the free end of hinged platform 44. Wedge 50 can be repositioned by gripping and manipulating handle 54 of shaft 52, which is located on the back edge of wedge 50.

The rear of DC motor 42 is mounted atop hinged platform 44 and is powered by previously mentioned solar powered electrical device 58. Motor 42 is rated to rotate at a speed of less than 120 RPM, e.g., 6 RPM. A gear reduction device may be used to produce the desired speed.

Rotor coupling 39 protrudes upwardly from the drive end of motor 42 and detachably connects through shaft 38 to ball 36 (FIG. 2). Ball 36 fits into an externally threaded socket 34 on the underside of circular base 12. Internally threaded socket collar 40 screws onto the external threads of socket 34 to capture ball 36. The friction thereby applied to the surface of ball 36 maintains the position of base 12 with respect to shaft 38. Ball 36, socket 34, and socket cap 40 are collectively referred to as a ball and socket joint.

Previously mentioned base 12 has in this embodiment a light reflector (mirror) 14 with a flat reflective upper surface 16, shown in FIG. 3 with a directional axis 18 projecting outwardly normal to the center of surface 16. In some embodiments, reflective upper surface 16 may be slightly convex or concave with directional axis 18 again projecting normally from the center. Reflector 14 of base 12 is bounded by a peripheral wall 22 having a substantially square locating tab 24 protruding radially inward from wall 22.

Overlaying the reflective surface 16 is pattern 26 (also referred to as template or mask) in the form of a thin opaque disc having a diameter sized to fit inside wall 22 and a notch 30 embracing tab 24. (Pattern 26 and base 12 are together an example of a reflective device, also referred to as light redirecting device). Notch 30 is aligned with opening 28, that is, with the beak of a bird-shaped opening. Alternatively, opening 28 may be any other desired symbol, logo, figure or other indicia. When pattern 26 is in place opening 28 exposes a portion of reflective surface 16.

Pattern 26 can be made of paper, cardboard, plastic, or any other substantially opaque material. In some embodiments the pattern can be translucent to provide a special effect. A kit or collection of patterns may be provided with display device 10 (or procured separately) allowing the user to change the pattern as desired. Also, in some embodiments reflective upper surface 16 may be painted to mask or color portions of the reflective surface to produce the desired image.

Figure 4:
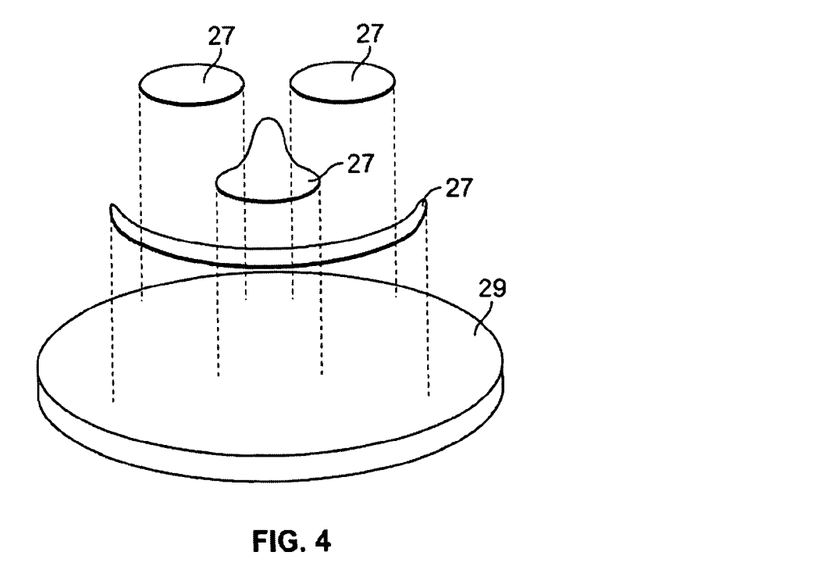
FIG. 4 is an exploded perspective view of a reflective device that is an alternate to that of FIG. 1.

Referring to FIG. 4, a reflective device may be formed by affixing reflective appliqués 27 to solid opaque base 29 to form a pattern. Appliqués 27 are shown having the shapes of a pair of eyes, a nose, and a mouth arranged to form a reflective surface in the shape of a face. In other embodiments, reflective appliques 27 may have other shapes such as animals, numbers, letters, or any other desired indicia that may be attached to base 29 using adhesives, fasteners, or other suitable attachment means.

Referring again to FIG. 2, previously mentioned pattern 26 (FIG. 1) is replaced with a light redirector 26" that is placed on base 12 to act as a light redirecting device. Redirector 26" is a prism-like device having a faceted refractive body 60. Depending on its orientation the numerous facets of body 60 prismatically refract and reflect incident sunlight I' in various directions thereby producing an aesthetically pleasing display. Body 60 is attached to disc 61, which is sized to fit on base 12. Disc 61 may be reflective in which case surface 16 need not be; although in some embodiments no reflective surface is employed and body 60 redirects light without relying on an independent reflector.

Figure 5A:
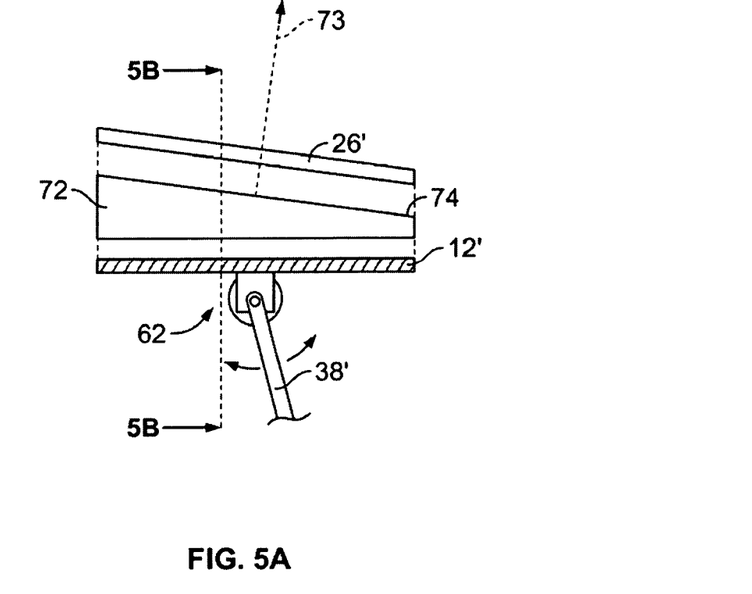
FIG. 5A is a side view of a reflective device that can replace a portion of the apparatus shown in FIG. 1.
Figure 5B:
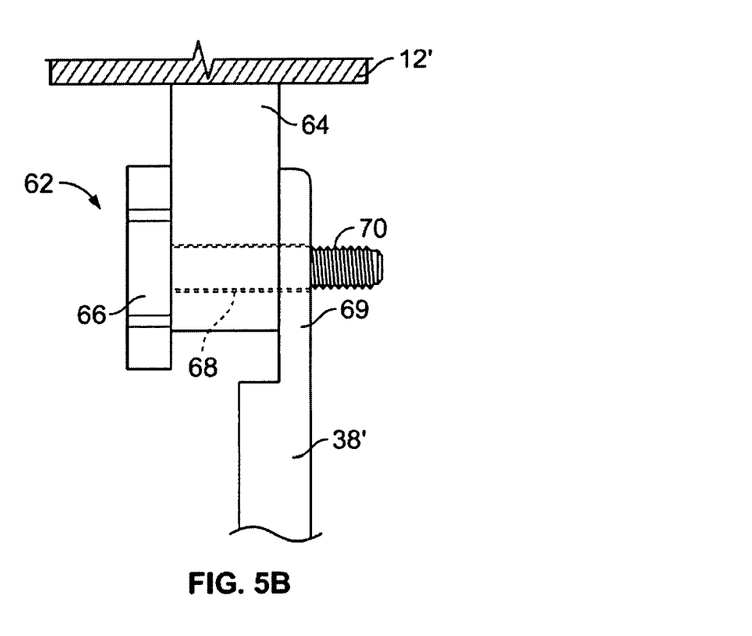
FIG. 5B is a detailed side view of the joint shown in FIG. 5A.

Referring to FIGS. 5A and 5B, the previously described reflective device and shaft (reflective device 12 and shaft 38 of FIG. 1) have been modified and corresponding components have the same reference numbers but marked with a prime ('). The distal end of shaft 38' is flattened into a blade 69 that is extends parallel to the axis of shaft 38'. A threaded bore extends perpendicularly through blade 69. Rectangular tab 64 depends from base 12' and has a though bore 68. Threaded shaft 70 of thumbscrew 62 extends perpendicularly from knurled thumbwheel 66 through bore 68 of tab 64 and screws into the threaded bore in blade 69. When thumbscrew 62 is tightened, thumbwheel 66 and blade 69 frictionally engage tab 64 to maintain base 12' in a chosen position.

Alternate reflector 72 is sized to fit within the peripheral wall of base 12' (see wall 22 of FIG. 2) and thus become part of the base structure. Reflector 72 is a truncated cylinder having a slanted reflective upper surface 74. Accordingly, directional axis 73 projecting normally from the center of reflective upper surface 74 is skewed relative to an axis normal to base 12'. Reflector 72 is selected from a collection of reflectors (not shown) having different slants to allow the user to skew directional axis 73 by varying amounts. The slant of reflector 72 may be sufficient in some embodiments to eliminate the adjustable joint 62 (or the ball and socket joint 34/36/40 of FIG. 2). A pattern 26' may be laid atop reflector 72. In some embodiments, reflective upper surface 74 may be somewhat convex or concave with directional axis 73 again projecting normally from the center. In some embodiments, reflective upper surface 74 of reflector 72 may be painted to mask or color portions of the reflective surface to produce the desired image. The desired reflector 72 may be selected from a collection of reflectors (not shown) having different slants and painted reflective upper surfaces.

Figure 6:
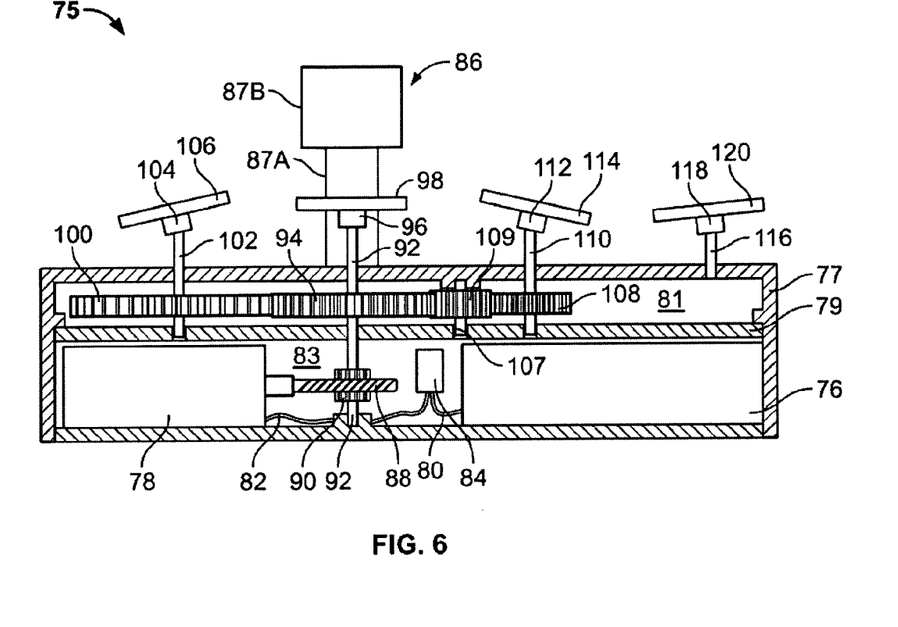
FIG. 6 is an elevational view, partly in section, of a reflective device that is an alternate to that of FIG. 1.

Referring to FIG. 6, display device 75 has a ganged plurality of spinning reflective devices 98, 106, and 114 (also referred to as reflectors) and a non-motorized but adjustable reflective device 120. Hollow housing 77 has a panel 79 dividing the housing interior into upper compartment 81 and lower compartment 83. Battery 76 (also referred to as power source), located in lower compartment 83, is electrically connected to switch 84 via wires 80. Switch 84 can electrically connect motor 78 to battery 76 via wires 82.

Motor 78, also located in lower compartment 83, drives worm 88 in order to drive gear 90 and its integral shaft 92, which is journalled in (a) the floor of compartment 83, (b) panel 79, and (c) the ceiling of compartment 81.

Shaft 92 connects through ball and socket joint 96 to reflective device 98 (all similar to reflective device 12 of FIG. 3).

Drive gear 94 is coaxially attached to shaft 92 and meshes with driven gear 100 to drive shaft 102, which is journalled between panel 79 and the ceiling of compartment 81. Shaft 102 connects through ball and socket joint 104 to reflective device 106 (similar to reflective device 98).

Drive gear 94 also meshes with the spur gear 109 on shaft 107, which is journalled between panel 79 and the roof of housing 77. Spur gear 109 meshes with driven gear 108 to drive shaft 110, which is journalled between panel 79 and the ceiling of compartment 81. Shaft 110 connects through ball and socket joint 112 to reflective device 114 (similar to devices 96 and 98). Stationary shaft 116 is fixedly attached atop of hollow housing 77 and connects through ball and socket joint 118 to reflective device 120 (also similar to devices 96 and 98).

Figure 7:
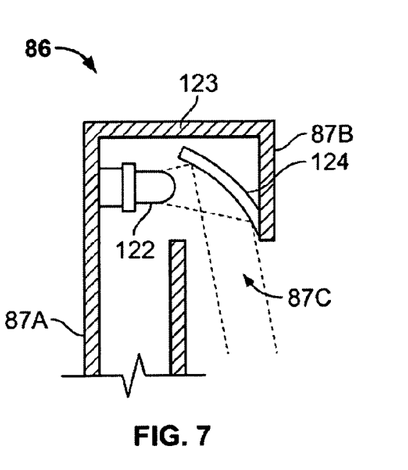
FIG. 7 is a detailed, cross-sectional view a portion of the device of FIG. 6.

Referring to FIGS. 6 and 7, light source 86 has a vertical square tube 87A rising from the top of housing 77 and communicating with housing 77 and with a wider rectangular hood 87B having an downwardly facing outlet 87C. LED 122 is mounted on a back interior wall of hood 87B and is electrically connected to switch 84 by wires (not shown). In this embodiment, LED 122 emits a white light, however colored light is possible, such as light that is blue, green, red, etc. Alternatively, LED 122 may be a strobe, incandescent, fluorescent, neon or other type of light.

LED 122 is located at the focus of an off-axis parabolic mirror 124 which is attached to the opposite side of the interior of hood 87B. Light emitted from LED 122 is collimated by mirror 124 and reflected toward reflective device 98. Other methods of projecting collimated light onto reflective device 98 may be used as well; such as a collimating lens in conjunction with a flat mirror.

Figure 8:
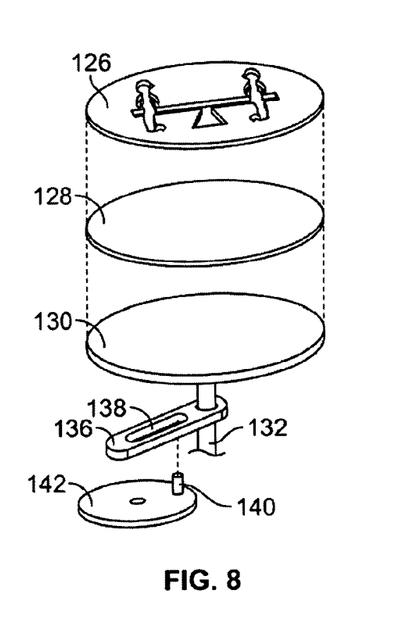
FIG. 8 is an exploded perspective view of a reflective device that is an alternate to those previously illustrated.

Referring to FIG. 8, pattern 126 is an opaque disk having an opening in the shape of two children on a see-saw. Pattern 126 will lay over colored filter 128, which is in turn placed atop the reflective upper surface of base 130. The order can be changed in some cases with filter 128 overlaying pattern 26 to produce a similar colored reflection. Filter 128 may be a single color or a mix of colors arranged in various patterns. Alternatively, other materials may be used in place of or in addition to colored filter 128 such as holographic diffraction grating film or a polarizing film. In some embodiments, reflective upper surface of base 130 may be somewhat convex or concave.

In a manner to be described presently, base 130 can be positioned perpendicular to shaft 132 to cause an image projected through pattern 126 to oscillate about its center at fixed location so the seesaw appears to be rocking in the usual manner.

The underside of base 130 is attached through an adjustable joint (not shown) to shaft 132, which is journalled in a housing (not shown). Arm 136 is radially attached to shaft 132 and has an elongated slot 138 for receiving pin 140. Pin 140 is peripherally attached to motor-driven disc 142 to orbit circularly. Pin 140 engages arm 136 via slot 138 and causes shaft 132 and base 130 to oscillate about the shaft axis.

Figure 9:
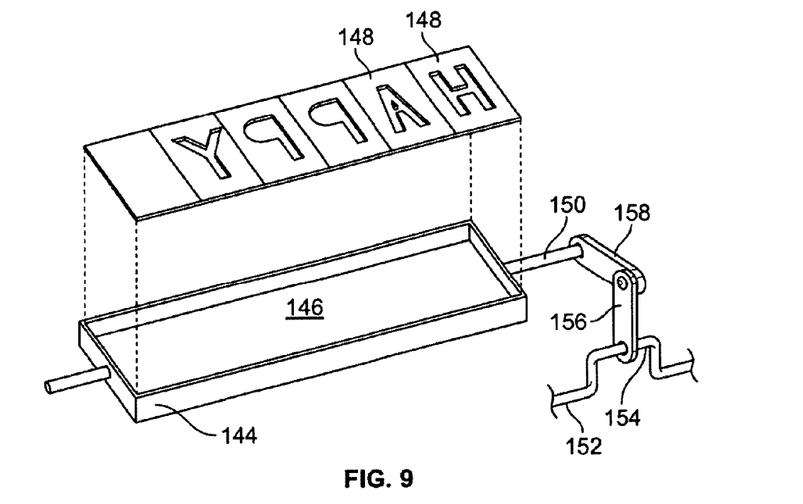
FIG. 9 is an exploded perspective view of a reflective device that is an alternate to those previously illustrated.

Referring to FIG. 9, the illustrated alternative embodiment is designed to project an image that moves in opposite directions along the same path. Letter stencils 148 placed over reflective upper surface 146 of rectangular base 144 are arranged to project an image of the word "HAPPY". Rectangular base 144 is parallel to and centered widthwise upon shaft 150. Shaft 150 is attached to pivot arm 158 whose swinging end is pivotally attached to one end of reciprocating link 156. The other end of link 156 is pivotally attached to crank offset 154 of motor-driven crankshaft 152. One or more additional devices each holding a group of letter stencils for displaying additional phrases may be attached to shaft 150 or to another synchronously driven shaft.

Figure 10:
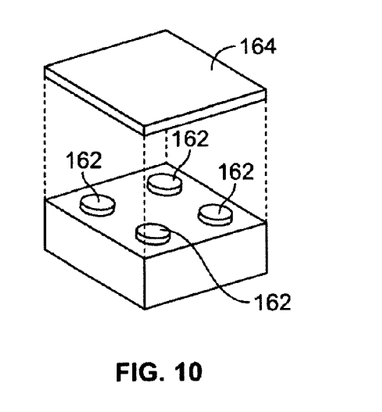
FIG. 10 is an exploded perspective view of a reflective device that is an alternate to those previously illustrated.

Referring to FIG. 10, the illustrated alternative embodiment has four actuators 162 for supporting and tilting reflective device 164. Actuators 162 are located in the four upper corners of housing 160. Actuators 162 are powered and individually actuated by a controller (not shown) that may be programmed to tilt reflective device 164 in a variety of patterns. The four actuators 162 move reflective device 164 with two degrees of freedom.

Alternatively, two actuators and a pivot may be arranged in a triangle. When the two actuators are operated in unison, device 164 rotates about an axis parallel to the side of the triangle with the actuators. When the two actuators are operated in opposition, device 164 rotates about an axis perpendicular to the side of the triangle with the actuators.

Figure 14:
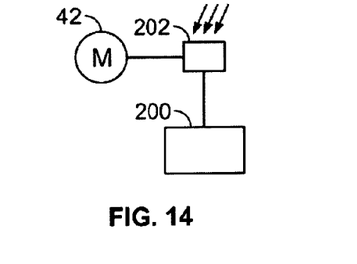
FIG. 14 is a schematic block diagram of circuit that can replace a portion of the apparatuses shown in FIGS. 1 and 6.

Referring to FIG. 14, in some embodiments the solar powered device (solar cell 58 of FIG. 1) may be replaced with a light actuated switch 202 such as a phototransistor coupled between battery 200 (or other power source) and previously mentioned motor 42. Switch 202 is open under low or no light and closed when exposed to bright light thereby electrically connecting battery 200 to motor 42.

Similarly, switch 84 of display device 75 (FIG. 6) may be a similar light actuated switch connected between battery 76 and motor 78 shown in FIG. 6.

To facilitate an understanding of the principles associated with the foregoing apparatus, its operation will be briefly described in connection with the display device 10 illustrated in FIGS. 1-3 and 11. A pattern 26, selected from a collection of patterns, is placed on base 12 overlaying reflective surface 16 with notch 30 engaging tab 24. (Note pattern 26 of FIG. 1 is chosen instead of device 60 of FIG. 2.)

Socket collar 40 of the ball and socket joint is loosened to allow angular adjustment of base 12. Base 12 may be temporarily oriented so that reflective surface 16 is brought substantially perpendicular to the axis of shaft 38 before tightening socket collar 40 to lock base 12 in this normal position.

Figure 11:
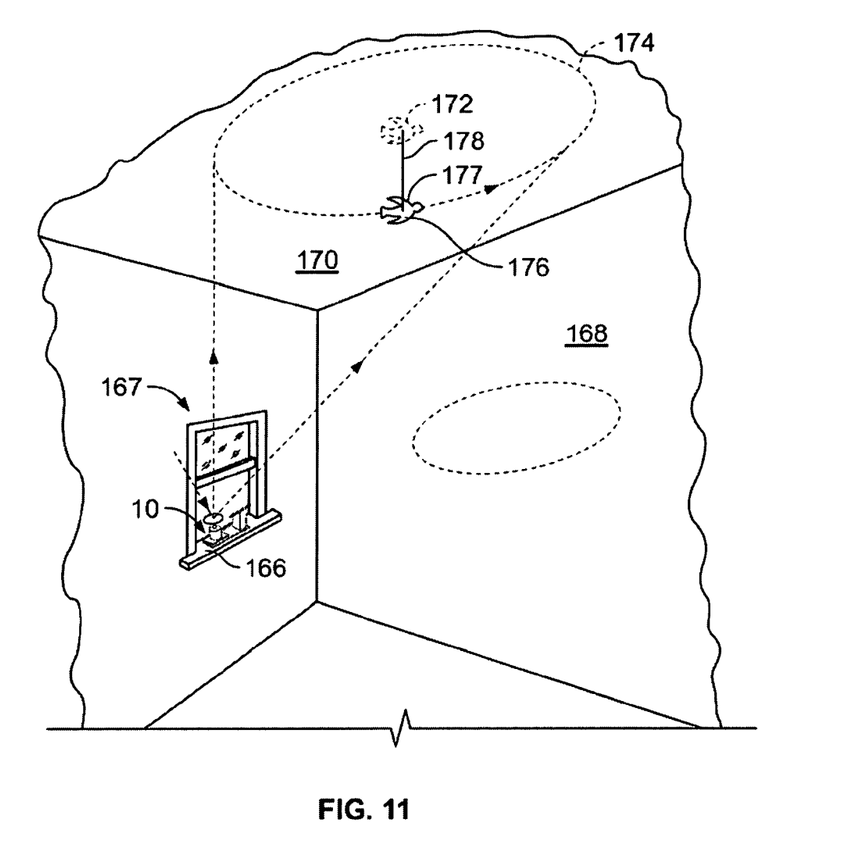
FIG. 11 is a perspective view of the the device of FIG. 1 installed in a room.

Solar cell 58 may be covered to disable motor 42 and prevent rotation of base 12. Display device 10 is then placed in a desired location such as windowsill 166 (FIG. 11) so that sunlight shines on the part of reflective surface 16 exposed through opening 28 of pattern 26. The sunlight is reflected by surface 16 to project a patterned design onto one or more of the surrounding surfaces 168/170 (FIG. 11).

The projected image may be steered toward central position 172 (shown in phantom) on ceiling 170 by (a) moving wedge 50 toward or away from hinge 46 and (b) turning base 48 azimuthally. Moving wedge 50 toward hinge 46 tilts directional axis 18 nearer to window 167, causing the projected image to move radially toward window 167 as well. Conversely, moving wedge 50 away from hinge 46 tilts directional axis 18 away from window 167 causing projected image 176 to move radially away from window 167 as well. Turning base 48 azimuthally causes the projected image to move azimuthally relative to window 167 along a curve on ceiling 170. In this manner, the projected image can eventually be placed at central location 172.

Socket collar 40 is then loosened again and base 12 is tilted about the longitudinal axis of bird shaped opening 28 (axis extending from the tip of the bird's beak rearward through center of the bird's tail feathers). This tilting causes projected image 176 to move from position 172 to position 177 approximately along line 178. Tilting device 12 causes directional axis 18 to be skewed relative to the axis of shaft 38 as shown in FIG. 3. The tilting of device 12 as shown in full in FIG. 3 causes incident sunlight I to reflect along path O.

Solar cell 58 may be uncovered to power motor 42 and rotate shaft 38. Consequently, the directional axis 18 follows a conical surface (nutates). Therefore, reflected path O also begins moving along a conical surface, eventually reaching path O' when shaft 38 rotates 180° at which time device 12 is in the position shown in phantom in FIG. 3.

The foregoing conical surface projects an elliptical path 174 on ceiling 170 with its major axis pointing to window 167. The longitudinal axis of the projected bird image remains tangent to path 174 because pattern 26 was tilted about its longitudinal axis. (Care must be taken to tilt pattern 26 correctly so that motor 42 moves the projected image forwardly; otherwise pattern 26 must be tilted in the opposite direction along the same longitudinal axis.) Thus, when projected image 176 traverses the closed curved path 174, it "points" in the direction of travel. In this case, with reflective device 12 rotating clockwise (viewed from above), the projected bird image travels beak first counterclockwise (viewed from below).

In the embodiment of FIGS. 5A and 5B, tab 64 protruding from underside of reflective device 12' is oriented with respect to the aligning tab (tab 24 of FIG. 1) to allow reflective device 12' to be tilted only about the appropriate axis thereby maintaining the proper orientation of reflective device 12' and opening 28 with respect to shaft 38'.

Although projected image 176 of FIG. 11 traverses closed curved path 174 in the middle of ceiling 170, display device 10 may be adjusted to produce other paths as well. The projected image may traverse a closed curved path on one or more surrounding surfaces such as the ceiling and an adjacent wall, the ceiling and two adjacent walls, two adjacent walls, or one wall.

As the day progresses the movement of the sun causes closed curved path 174 to shift from its initial position. If desired, wedge 50 and base 48 may be readjusted to recenter closed curved path 174. Wedge 50 is adjusted to change the radial distance from the window, while base 48 may be rotated to move path 174 azimuthally relative to window 167.

When sunlight stops shining on reflective device 12 and solar cell 58, as the day progresses, the device ceases operation. When sunlight returns to the device on the next day, display device 10 will again project an image 176 traveling along closed curved path 174.

The operation and adjustment of display device 75 of FIG. 6 is similar to that described above for display device 10. For each reflective device 98/106/114/120 a pattern (like pattern 26 of FIG. 1) is selected from a group of patterns and is placed on the desired reflective device. Display device 75 is then placed in a location such as a windowsill where it will receive sunlight and is adjusted as before. In this embodiment, shims (not shown) are used to tilt device 75. Also, housing 77 is rotated azimuthally to locate the associated projected images on the surrounding surfaces as desired. In some embodiments, four adjustable legs may be mounted on the underside of hollow housing 77 to provide for adjustment of housing 77.

Each of the motorized reflective devices 98/106/114 are titled to set the radius of the closed curved path the projected images will traverse. Non-motorized reflective device 120 is adjusted to move its associated projected image to a desired fixed location. Switch 84 is then actuated, causing motorized reflective devices 98/106/114 to rotate and light source 86 to illuminate. The location and motion of the projected images are then examined and the device may be readjusted using the techniques previously described.

Figure 12:
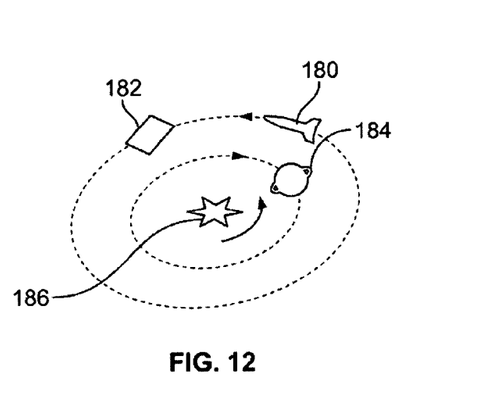
FIG. 12 is a schematic diagram of images projected by the device of FIG. 6.

Referring to FIGS. 6 and 12, four projected images are produced by the display device of FIG. 6. Several patterns are selected and placed on reflective devices to produce each of the projected images 180/182/184/186. A rocket ship pattern is placed on device 106 and its image 180 travels in a counterclockwise closed curved path shared with docking station image 182. Station 182 is stationary and produced by placing a pattern on a non-rotating device 120 and adjusting it.

Accordingly, rocket ship image 180 will periodically land on and launch from station 182.

A pattern on reflective device 114 produces Saturn-like image 184, which orbits clockwise causing it to travel in a closed curved path in a direction opposite to that of image 180. The pattern on reflective device 98 produces star image 186. Device 98 is perpendicular to shaft 92 so image 186 rotates about a stationary point.

Figure 13:
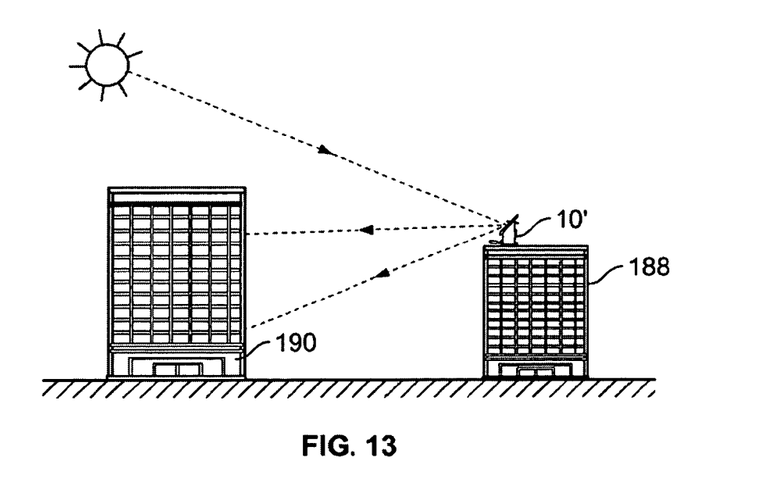
FIG. 13 is an elevational view of a reflective device that is an alternate to that of FIG. 1 installed atop a building to project an image onto another building.

Referring to FIG. 13, a display device 10', similar to device 10 of FIG. 1 but scaled to a larger size projects large images. The reflective surface of device 10' may in some cases be a convex mirror to produce a larger image than that produced by a similarly sized flat reflective surface. The reflective surface of device 10' may in some other cases have a concave mirror to project either a larger, less intense image or a smaller, more intense image than that produced by a similarly sized flat reflective surfaces depending on the focal length of the mirror.

Device 10' is located on the roof of building 188 and is adjusted using a method similar to that described for device 10. However, the greater distance from device 10' to the building 190 requires the angular skewing of the mirrors to be much smaller as slight tilts will produce large movements of the projected image. In addition, the large distances involved may require more periodic adjustment of the device to keep the path of projected image on building 190.

In an alternative embodiment, the display device of FIG. 10 may be used in conjunction with a controller to follow the sun and produce an image on building 190 that is compensated for the sun's movement.

Obviously, many modifications and variations of the present invention are possible in light of the above teachings. It is therefore to be understood that within the scope of the appended claims, the invention may be practiced otherwise than as specifically described.

The invention claimed is:

1. A display device comprising:
   reflective device having a directional axis and a base with an overlaying pattern, said reflective device being arranged to reflect light in a beam that projects a design corresponding to said pattern; and
   a motor for cyclically moving said reflective device.

2. A display device according to claim 1 comprising:
   a collection of templates, said overlaying pattern being a selected one of said collection of templates, so that the design can be changed by replacing the selected one of said collection of templates with different ones of said collection.

3. A display device according to claim 1 wherein said base is reflective.

4. A display device according to claim 1 wherein said overlaying pattern is reflective.

5. A display device according to claim 1 wherein said motor is operable to simultaneously rotate said reflective device about said directional axis and reorient the directional axis.

6. A display device according to claim 1 wherein said motor has a rotatable shaft with a shaft axis, said reflective device being mounted on said shaft with said directional axis skewed from the shaft axis.

7. A display device according to claim 6 wherein said reflective device is adjustably mounted on said shaft to angularly adjust said directional axis relative to the shaft axis.

8. A display device according to claim 7 wherein said reflective device is mounted on said shaft with a ball and socket joint.

9. A display device according to claim 6 comprising:
   a solar powered electrical source coupled to said motor.

10. A display device according to claim 6 wherein said motor is adjustably mounted in order to tilt the rotatable shaft.

11. A display device according to claim 10 comprising:
    an adjustable platform for adjustably and tiltably supporting said motor.

12. A display device according to claim 6 wherein said motor is operable to oscillate said reflective device.

13. A display device according to claim 1 wherein said motor cyclically moves said reflective device in order to upwardly reflect sunlight for a full cycle and follow a closed curved path on a plane.

14. A display device according to claim 1 wherein said pattern comprises:
    a mask overlaying said reflective device.

15. A display device according to claim 14 wherein said mask is keyed to said reflective device in order to predetermine orientation of said mask on said reflective device.

16. A display device according to claim 14 comprising:
    a colored filter parallel to said mask.

17. A display device according to claim 1 wherein said pattern comprises:
    a collection of replaceable masks, a selected one of said masks overlaying said reflective device.

18. A display device according to claim 17 wherein said collection of replaceable masks includes a plurality of letter stencils, a selected series from said plurality of letter stencils being arranged on said reflective device.

19. A display device according to claim 1 wherein said pattern comprises:
    at least one reflective applique attached to said plate.

20. A display device according to claim 1 wherein said pattern comprises:
    a collection of reflective appliques, a selected one or more of said reflective appliques being attached to said plate.

21. A display device according to claim 20 wherein a chosen subset of said collection of reflective appliques are attached to said plate.

22. A display device according to claim 1 wherein said reflective device comprises a faceted refractive member arranged to separate colors prismatically.

23. A display device according to claim 1 wherein said reflective device comprises a holographic diffraction device.

24. A display device according to claim 1 comprising:
    a light source adapted to shine on said reflective device.

25. A display device according to claim 1 wherein said reflective device comprises:
    a ganged plurality of spinning reflectors.

26. A display device according to claim 25 wherein at least some of said spinning reflectors spin differently.

27. A display method employing a reflective device having a directional axis, comprising the steps of:
    placing the reflective device in a position to reflect sunlight onto a surface; and
    rotating said reflective device and reorienting the directional axis to reflect sunlight onto said surface to follow a closed curved path.

28. A display method according to claim 27 wherein the step of rotating said reflective device is performed by moving said directional axis around a conical surface and rotating said mirror axially with respect to said conical surface.

29. A display method according to claim 27 employing a shafts wherein the step of rotating said reflective device is performed by:
    attaching said reflective device to said shaft;
    angularly adjusting said directional axis relative to said shaft; and
    rotating said shaft.

30. A display method according to claim 29 wherein the step of angularly adjusting the directional axis is performed to skew said directional axis relative to said shaft.

31. A display method according to claim 30 comprising the step of:
tilting said shaft to reposition the closed curved path.

32. A display method according to claim 31 wherein the closed curved path is projected onto either a ceiling or wall of a room.

33. A display method according to claim 31 wherein the closed curved path is projected onto an exterior surface of a building.

34. A display method employing a base and a collection of overlaying patterns, comprising the steps of:
selecting one or more of said patterns for placement upon the base;
orienting said base to receive incident light; and
cyclically moving said base in order to reflect light toward a surface to follow a path on said surface cyclically.

35. A display device comprising:
a light redirecting device having a base with an overlaying light redirector, said light redirecting device being arranged to redirect light in a design determined by said light redirector; and
a motor for rotating and nutating said light redirecting device.

36. A display device comprising:
at least one reflective device having a directional axis and a base with an overlaying pattern, said reflective device being arranged to reflect light in a beam that projects a design corresponding to said pattern; and
at least one support for resting on a horizontal surface and for supporting said reflective device at an angle tilted from horizontal.

37. A display device according to claim 36 wherein said at least one support is operable to adjustably and tiltably support said reflective device.

38. A display device according to claim 36 wherein said support is a wedge-shaped member for tilting said reflective device.

39. A display device according to claim 36 wherein said at least one reflective device comprises a collection of reflective devices each with an overlaying pattern, said at least one support is a collection of wedge-shaped members for attached to a different corresponding one of said reflective devices for tilting them.

* * * * *